Patented Nov. 28, 1944

2,363,782

UNITED STATES PATENT OFFICE 2,363,782

PROCESS FOR SEPARATING HYDROCARBONS

Frederick E. Frey, Bartlesville, Okla., assignor to Phillips Petroleum Company, a corporation of Delaware No Drawing. Application October 5, 1942,
Serial No. 460,865

3 Claims. (Cl. 260—677)

My invention relates to an improved process for separating the components of a hydrocarbon mixture. More particularly, this invention relates to a process of liquid-liquid extraction in which the hydrocarbon mixture that is to be separated into fractions of unlike composition or properties is contacted with a suitable solvent. Still more particularly, it relates to a process for the separation of $C_3$ to $C_7$ paraffins from close-boiling aliphatic olefins and for the resolution of mixtures of isomeric $C_4$ to $C_7$ aliphatic olefins.

Hydrocarbon mixtures of a complex nature are produced in various petroleum cracking processes and in other ways. In order to utilize to best advantage certain components of such mixtures, it is frequently desirable to isolate or recover these components in a substantially concentrated form. Thus, for instance, butane-butene cuts that are produced in petroleum refining operations may advantageously be processed in such a manner as to produce a butene concentrate that is suitable for use as a charging stock for the manufacture of butadiene or for the manufacture of high octane number gasoline by polymerization or by alkylation with isoparaffins.

It is known to employ certain selective solvents, both of organic and inorganic nature, to treat certain mixtures of hydrocarbons of different types in order to effect a more or less complete separation of the hydrocarbons in the mixture. An example is the liquid-liquid extraction of lubricating oil fractions with such selective solvents as sulfur dioxide, "Chlorex" (beta,beta-dichloroethylether), nitrobenzene, aniline, dimethyl formamide, and phenol in order to effect separation of relatively less paraffinic hydrocarbons from relatively more paraffinic hydrocarbons. In general, the solubility relationships of lubricating oil fractions and of the commonly used selective solvents are such that incomplete miscibility of oil and solvent exists at temperatures that are conveniently employed in a liquid-liquid extraction process. When liquid-liquid extraction of liquefied normally gaseous hydrocarbon mixtures or low-boiling normally liquid hydrocarbon mixtures is considered, it is found that in order to maintain the necessary condition of incomplete miscibility of solvent and hydrocarbon mixture it is necessary to work at lower temperatures than in lubricating oil extraction.

In many cases the known method of liquid-liquid extraction of light hydrocarbon mixtures requires operating temperatures so low that economically undesirably large amounts of refrigeration are necessary. Thus, as shown in an article by Seyer and Todd published in "Industrial and Engineering Chemistry," vol. 23, page 325 (1931), sulfur dioxide and various normal paraffin hydrocarbons have the following critical solution temperatures:

| System | Critical solution temperature |
|---|---|
| | °C. |
| n-Butane-sulfur dioxide | −4.7 |
| n-Hexane-sulfur dioxide | 10.2 |
| n-Octane-sulfur dioxide | 26.9 |
| n-Decane-sulfur dioxide | 37.3 |
| n-Dodecane-sulfur dioxide | 47.3 |
| n-Tetradecane-sulfur dioxide | 55.5 |
| n-Dotriacontane-sulfur dioxide | 110.0 |

It can be seen that, if butenes were to be extracted from a mixture with n-butane, using sulfur dioxide as the selective solvent, the operating temperature could not exceed −4.7° C. Furthermore, since it is recognized that in general an olefin will have a considerably lower critical solution temperature in a mixture with sulfur dioxide than will the corresponding paraffin, it can be seen that, in liquid-liquid extraction of a butane-butene mixture with sulfur dioxide, an even lower extraction temperature is required, for the extraction temperature must be lower than the critical solution temperature of the mixture of sulfur dioxide and the particular mixture of hydrocarbons under treatment. A similar situation exists when employing many other known selective solvents.

It has been proposed to raise the critical solution temperature of the mixture of solvent and hydrocarbon mixture being extracted by adding to the primary solvent a secondary solvent that will impart to the resulting mixed solvent the property of more limited miscibility or compatibility with the hydrocarbon mixture. However, such a method is open to serious objections from the standpoint of the effect of a secondary solvent upon both the selectivity and, in particular, the capacity of a primary solvent. Further objections arise from the difficulties that use of a mixed solvent introduces in the extraction process, such as possible chemical interaction between the solvents, or between solvents and materials of construction, or the need for relatively more elaborate steps to recover from the raffinate the mixed solvent, that will to some extent be dissolved therein, or to recover hydrocarbon extract from the solvent phase.

The principal object of my invention is to provide an improved process for the selective solvent extraction of $C_3$ to $C_7$ aliphatic hydrocarbons at least one of which is an olefin. Another object is to provide such a process for the separation of $C_3$ to $C_7$ aliphatic olefins from close-boiling paraffins. Still another object is to provide an improved process for the resolution of mixtures of isomeric olefins. Still another object is to provide an improved process for the separation of iso $C_4$ to $C_7$ aliphatic olefins from straight-chain aliphatic olefins of a corresponding number of carbon atoms. Numerous other objects will more fully hereinafter appear.

I have found that if a liquid mixture comprising light paraffin and olefin hydrocarbons to be extracted with a selective solvent is diluted with a high-boiling oil of low solubility in the solvent, and free from double bonds, the extraction process may be practiced at higher temperatures than would otherwise be possible, and thus the need for refrigeration may be minimized or eliminated. As a high-boiling diluent may be employed any one of various materials, such as mineral seal oil, paraffinic and/or naphthenic and relatively nonaromatic kerosenes, and the like. As a general rule, I prefer to use as a diluent an essentially paraffinic material of sufficiently high molecular weight to possess quite low miscibility with the solvent or solvents employed. The diluent may either consist of a substantially pure compound or be composed of a number of different compounds.

The diluent employed according to my process may be a mineral seal oil, oil of the type that is used in absorption processes of making natural gasoline, refined white mineral oil or similar material preferably essentially paraffinic (which includes cycloparaffinic) in nature. The diluent must possess a boiling point considerably higher than the boiling points of the principal components of the hydrocarbon mixture to be extracted so that it is readily separated therefrom by stripping of fractional distillation. Ordinarily its boiling point is so high that it may be readily separated from the solvent in the same manner. In general the diluent is a high-boiling hydrocarbon oil consisting essentially of hydrocarbons ranging upwardly from decane. Its initial boiling point is preferably at least 175° C. and usually 215° C. or higher and the average molecular weight is usually at least 200. While a paraffinic oil of the nature of mineral seal oil or white mineral oil such as "Nujol" is preferred, I may use a somewhat lower boiling essentially paraffinic or naphthenic material such as kerosene which is substantially free from aromatic components and has an initial boiling point of at least about 175° C. Preferably the diluent is substantially insoluble in the selective solvent and does not form an azeotrope therewith.

Since a considerable difference in boiling range will exist between the diluent employed and the hydrocarbon mixture to be extracted according to my improved process, only relatively simple fractionations will be required to separate the diluent from the raffinate or from the hydrocarbon extract. The diluent so recovered may be recycled and reused for a fresh portion of the hydrocarbon mixture to be extracted.

Known procedures may be followed in recovering hydrocarbon extract from the rich solvent. The exact procedure most desirable for any particular case will depend upon the solvent employed and the properties of the hydrocarbons in the extract. When, for example, sulfur dioxide is used as solvent to extract hexenes from a hexane-hexene mixture to which mineral seal oil has been added as diluent, the rich solvent phase, after withdrawal from the extraction unit, may be fractionally distilled to remove sulfur dioxide, which may be recycled to the extraction unit. The resulting solvent-free residue, which consists of six-carbon hydrocarbons and the high-boiling diluent, is further fractionally distilled to effect a separation between the six-carbon hydrocarbons and the high-boiling diluent. In certain cases in which the amount of high-boiling diluent dissolved in the rich solvent is negligible, separation of solvent and hydrocarbon extract may be correspondingly simplified. In cases in which a high-boiling solvent such as "Chlorex" is employed, it is preferable to choose a high-boiling diluent of such a boiling range as to avoid including the boiling point of the solvent in the boiling range of the diluent. However, it is often possible to employ a diluent whose boiling range does include that of the solvent by using appropriate known methods for separating such mixtures, as for example by steam distillation.

After the raffinate is withdrawn from the extraction unit it may be necessary to recover from it dissolved or suspended solvent, as by fractional distillation or in any other suitable known fashion. Likewise, the high-boiling diluent contained in the raffinate may be recovered by fractionation and returned to the process.

Not only may my improved extraction process be applied to the separation of olefins from paraffins, but I have found that, in addition, my process may be applied to effect a separation of isomeric straight-chain and branched-chain olefins. Thus, in accordance with my invention, I may effect the separation, into two or more fractions of different compositions, of a hydrocarbon mixture comprising two or more isomeric olefins of different carbon-skeletal structure. The utility of this aspect of my invention is evident, for it provides a way to effect a separation of such isomeric olefins at moderate temperatures, whereas extremely low temperatures involving excessive refrigeration costs would be required with the commonly used selective solvents according to known processes.

Illustrating the difficulty that would be encountered in carrying out extraction of an olefinic concentrate by known methods is the experimental observation that a liquid mixture of about 10 per cent butene-1 and about 90 per cent butene-2 is miscible in all proportions with liquid sulfur dioxide at temperatures as low as −74° C. But by the addition of moderate amounts of a high-boiling diluent, according to my invention, to such a mixture of butenes, the critical solution temperature may be raised to 0° C. or higher.

In carrying out my invention, I may employ known procedures and equipment for bringing about contacting of two immiscible liquids. Thus, one or more stages of countercurrent extraction may be performed in apparatus of the mixer and settler type, or countercurrent contacting may be performed in a suitable extraction tower. The temperature at which the liquid-liquid contacting is carried out will vary, depending upon the composition of the hydrocarbon mixture to be separated, the amount of high-boiling diluent that is added to the hydrocarbon mixture, the particular solvent employed, and the ratio of solvent volume to volume of the hydrocarbon mixture. In every case, the minimum temperature will be higher than the temperature of miscibility of the hydrocarbon mixture and the particular solvent in the absence of added diluent. Also, in every case, the maximum temperature will lie below the critical solution temperature of the mixture consisting of hydrocarbon mixture being extracted, the added diluent, and the particular solvent in use. The exact value of the critical solution temperature is dependent upon the proportion of high-boiling diluent added to the hydrocarbon mixture being extracted. A pressure equal to, or greater than, that required to maintain essentially liquid phase conditions within the contacting equipment is necessary.

While the process of my invention is particularly applicable using sulfur dioxide as the selective solvent in view of its extremely low boiling point necessitating use of excessive refrigeration in the methods of extraction heretofore employed, other selective solvents may be used such as phenols such as phenol (preferably in admixture with a minor proportion of water), cresol, resorcinol, etc., chlorinated ethers such as "Chlorex," aldehydes such as benzaldehyde, furfural, etc., aromatic nitro compounds such as nitrobenzene, ethylene chlorohydrin (either anhydrous or containing a minor proportion of water), alcohols such as furfuryl alcohol, ethylene glycol, glycerol, diethylene glycol, anhydrous methyl alcohol, alkyl ethers of ethylene and diethylene glycol, such as monomethyl ether of ethylene glycol, esters such as phenyl acetate, benzyl acetate, methyl furoate, resorcinol monoacetate, etc., N,N-dialkyl amides such as dimethyl formamide, etc.

Although my improved extraction process is applicable to the separation of a wide range of paraffin-olefin mixtures, or of mixtures of isomeric olefins of different carbon-skeletal structure, it is particularly applicable to the separation of such mixtures containing hydrocarbons having from three to seven carbon atoms per molecule, and it possesses its greatest usefulness in separating close-boiling mixtures of such hydrocarbons.

My invention may be further illustrated and described by the following specific examples:

Example 1

A single batchwise liquid-liquid extraction was carried out on a refinery butane cut of the following composition, in mole per cent:

| | |
|---|---|
| i-Butene | 23 |
| n-Butenes | 35.7 |
| Butanes | 41.3 |
| | 100.0 |

Liquid sulfur dioxide was used as the solvent in the extraction. In preliminary experiments it was found that the critical solution temperature of the butane-butene mixture with liquid sulfur dioxide was about −25° C. In order to raise the miscibility temperature of the system, there was added a measured amount of a light neutral oil to serve as the high-boiling diluent. The characteristics of this oil were about as follows:

| | | |
|---|---|---|
| Gravity, °A. P. I. | | 27.0 |
| Color (Saybolt) | | 20+ |
| Pour point | °F | 0 |
| Saybolt viscosity (100° F.) | sec | 106 |
| Flash point | °F | 325 |
| Fire point | °F | 365 |
| Solubility in liquid sulfur dioxide (25° C.) | volume per cent | <1 |

The composition of the hydrocarbon-sulfur dioxide mixture after addition of the light oil as diluent was as follows, in per cent by weight:

| | |
|---|---|
| Butane-butenes | 31.5 |
| Light oil | 16.4 |
| Sulfur dioxide | 52.1 |
| | 100.0 |

By experiment it was found that this mixture formed two liquid phases at temperatures below about −5° C., and became homogeneous at higher temperatures. The actual extraction was performed by cooling to −10° C. and agitating for a sufficient time to ensure equilibrium, after which the phases were separated; the light oil was separated by distilling each phase; and analyses then were made on the resulting distillate mixtures of sulfur dioxide and butane and butenes. The compositions of solvent and hydrocarbon phases were found to be as follows:

| | Mole per cent | Mole per cent on $SO_2$-free basis |
|---|---|---|
| Solvent (extract) phase: | | |
| Sulfur dioxide | 71.5 | 0 |
| i-Butene | 7.7 | 27.1 |
| n-Butenes | 10.7 | 37.4 |
| Butanes | 10.1 | 35.5 |
| | 100.0 | 100.0 |
| Hydrocarbon raffinate phase: | | |
| Sulfur dioxide | 50.9 | 0 |
| i-Butene | 10.6 | 21.5 |
| n-Butenes | 17.0 | 34.7 |
| Butanes | 21.5 | 43.8 |
| | 100.0 | 100.0 |

It is seen from these data that a considerable enhancement in the olefin content of the butane-butene extract resulted from the single contacting; whereas the butanes in the original butane-butene mixture amounted to 41.3 mole per cent, the butanes in the extract amounted to only 35.5 mole per cent. Thus by the addition of the light oil as diluent, it was possible to conduct the extraction successfully at a temperature 25° C. above the critical solution temperature of the sulfur dioxide and the butane-butene mixture. A further concentration of olefins in the extract could have been obtained by successive stages of extraction.

The foregoing extraction data also illustrate the phase of my invention which deals with the separation of isomeric straight-chain and branched-chain olefins. It is seen that the mole ratio of isobutene to normal butenes in the original butane-butene mixture was 0.644, whereas the ratio in the extract was 0.724; thus, a partial separation of the isobutene from the normal butenes was effected, and this separation could have been made more nearly complete by repeating the extraction a number of times. By suitable choice of conditions, depending upon solvents and charge stocks, it is possible, according to my invention, either to separate olefins from paraffins or to separate isomeric branched-chain olefins from straight-chain olefins.

Example II

A single batch-wise liquid-liquid extraction with sulfur dioxide was made on a second portion of the refinery butane cut described in Example I. Before performing the extraction, there was added to the refinery butane cut a quantity of light neutral oil as diluent; this light oil was of the same composition as that described in Example I. The composition of the total sulfur dioxide-hydrocarbon mixture, when brought together for extraction, was as follows, in per cent by weight.

| | |
|---|---|
| Butane-butenes | 22.7 |
| Light oil | 37.1 |
| Sulfur dioxide | 40.2 |
| | 100.0 |

By preliminary experiments it was determined that the miscibility temperature of this mixture was about 9.8° C. and that two liquid phases existed at lower temperatures. The actual extraction was carried out at 0° C. by a procedure like that described in Example I.

After removal of the light oil diluent the compositions of the hydrocarbon and the solvent phases resulting from the extraction were found to be as follows:

| | Mole percent | Mole percent on $SO_2$-free basis |
|---|---|---|
| Solvent phase: | | |
| Sulfur dioxide | 79.2 | 0 |
| i-Butene | 6.2 | 29.8 |
| n-Butenes | 8.3 | 39.7 |
| Butanes | 6.3 | 30.5 |
| | 100.0 | 100.0 |
| Hydrocarbon phase: | | |
| Sulfur dioxide | 46.3 | 0 |
| i-Butene | 11.9 | 22.2 |
| n-Butenes | 18.8 | 35.0 |
| Butanes | 23.0 | 42.8 |
| | 100.0 | 100.0 |

It is seen from these data that a selective separation of butenes from butanes resulted from the extraction, and this result was obtained at a temperature about 35° C. above the critical solution temperature of the solvent and the butane-butene mixture. A more complete separation would be obtained by further stages of extraction or by a continuous countercurrent operation.

In this example, as in Example I, the extraction effected considerable separation of isobutene from normal butenes, for the ratio of isobutene to normal butenes in the extract was 0.751, whereas the ratio of isobutene to normal butenes in the original butane-butenes mixture was only 0.644.

Because the invention may be practiced otherwise than as specifically shown herein, and because many modifications and variations of it will be apparent to those skilled in the art, it should not be restricted except as specifically indicated in the following claims.

I claim:

1. A process of effecting the separation of isomeric close-boiling aliphatic $C_4$ to $C_7$ olefins of different carbon-skeletal structure from one another which comprises diluting a mixture of said isomeric aliphatic olefins with an essentially paraffinic high-boiling oil free from double bonds and having an initial boiling point of at least 175° C. in an amount such that the critical solution temperature of the mixture of the resulting mixture and sulfur dioxide described below is substantially above the critical solution temperature of the same mixture without said oil, extracting the resulting mixture with sulfur dioxide at a temperature below the critical solution temperature of the diluted olefin mixture and the sulfur dioxide but substantially above the critical solution temperature of the olefin mixture and the sulfur dioxide in the absence of said oil and at a pressure sufficient to maintain liquid phase conditions and thereby effecting preferential dissolution of the more branched olefin content of said mixture in the sulfur dioxide phase and concentration of the less branched olefin content of said mixture in the hydrocarbon phase, separating said phases, and recovering the olefins from the separated phases.

2. The process of claim 1 wherein said more branched olefin content is isobutene and said less branched olefin content is normal butene.

3. The process of claim 1 wherein said more branched olefin content is isobutene and said less branched olefin content is normal butene and wherein said extraction is carried out at 0° C.

FREDERICK E. FREY.